United States Patent
Nortman et al.

(10) Patent No.: US 10,161,774 B2
(45) Date of Patent: Dec. 25, 2018

(54) SYSTEMS AND COMPUTER PROGRAM PRODUCTS FOR MEASURING AIRFLOW RATES IN HEATING, VENTILATING, AND AIR CONDITIONING (HVAC) DUCTS AND HVAC SYSTEMS INCLUDING THE SAME

(75) Inventors: Randall C. Nortman, Cary, NC (US); Jan-Dieter Spalink, Durham, NC (US)

(73) Assignee: Truveon Corp., Durham, NC (US)

( * ) Notice: Subject to any disclaimer, the term of this patent is extended or adjusted under 35 U.S.C. 154(b) by 1573 days.

(21) Appl. No.: 13/302,284

(22) Filed: Nov. 22, 2011

(65) Prior Publication Data

US 2012/0125558 A1 May 24, 2012

Related U.S. Application Data

(60) Provisional application No. 61/416,500, filed on Nov. 23, 2010.

(51) Int. Cl.
| | |
|---|---|
| *G01F 1/69* | (2006.01) |
| *G06F 19/00* | (2018.01) |
| *F28F 27/00* | (2006.01) |
| *G01F 1/68* | (2006.01) |
| *G01F 1/698* | (2006.01) |
| *F24F 11/30* | (2018.01) |

(Continued)

(52) U.S. Cl.
CPC ............... *G01F 1/68* (2013.01); *F24F 11/30* (2018.01); *G01F 1/69* (2013.01); *G01F 1/698* (2013.01); *F24F 2110/00* (2018.01); *F24F 2110/30* (2018.01)

(58) Field of Classification Search
CPC ... G01F 1/68; G01F 1/69; G01F 1/698; G01F 1/684; G01F 1/696; G01F 1/6965; G01F 1/688; F24F 2011/0038; F24F 11/001; G01K 7/16; G01K 7/22
See application file for complete search history.

(56) References Cited

U.S. PATENT DOCUMENTS

| | | |
|---|---|---|
| 3,711,001 A | 1/1973 | Schopp |
| 4,905,514 A | 3/1990 | Wiseman |
| 5,212,983 A | 5/1993 | Ott et al. |

(Continued)

FOREIGN PATENT DOCUMENTS

| | | |
|---|---|---|
| WO | WO 96/02811 | 2/1996 |
| WO | WO 01/53901 A1 | 7/2001 |
| WO | WO 2010/039194 A1 | 4/2010 |

OTHER PUBLICATIONS

Notification Concerning Transmittal of International Preliminary Report of Patentability, PCT/US2011/061850, dated Jun. 6, 2013, 9 pages.

(Continued)

*Primary Examiner* — Roy Y Yi
*Assistant Examiner* — L. Anderson
(74) *Attorney, Agent, or Firm* — Ward and Smith, P.A.

(57) ABSTRACT

An airflow measurement system configured to be received in a duct of a heating, ventilating and air conditioning (HVAC) system is provided. The air flow measurement system includes a housing, and a plurality of cells positioned in the housing, the plurality of cells being configured such that air flows through the plurality of cells when the flow measurement system is positioned in the duct of the HVAC system, wherein at least one of the cells includes a self-heated thermistor.

14 Claims, 6 Drawing Sheets

(51) Int. Cl.
*F24F 110/00* (2018.01)
*F24F 110/30* (2018.01)

(56) References Cited

U.S. PATENT DOCUMENTS

| | | | | |
|---|---|---|---|---|
| 5,419,190 A | * | 5/1995 | Boyd | G01F 1/684 |
| | | | | 324/706 |
| 5,705,734 A | | 1/1998 | Ahmed | |
| 2004/0139799 A1 | * | 7/2004 | Sudolcan | G01F 1/6965 |
| | | | | 73/204.17 |
| 2005/0173548 A1 | | 8/2005 | Kramer | |
| 2006/0111816 A1 | * | 5/2006 | Spalink | F24F 11/006 |
| | | | | 700/276 |
| 2006/0144232 A1 | * | 7/2006 | Kang | B01D 46/0086 |
| | | | | 95/273 |
| 2010/0088044 A1 | * | 4/2010 | Vogel | G01F 1/684 |
| | | | | 702/45 |
| 2010/0163633 A1 | * | 7/2010 | Barrett | B60H 1/00871 |
| | | | | 236/49.3 |
| 2012/0078563 A1 | * | 3/2012 | Grabinger | F24F 11/001 |
| | | | | 702/104 |
| 2012/0125558 A1 | | 5/2012 | Nortman et al. | |
| 2013/0096722 A1 | | 4/2013 | Clanin | |

OTHER PUBLICATIONS

Notification of Transmittal of the International Search Report and the Written Opinion of the International Searching Authority, or the Declaration, PCT/US2011/061850, dated Apr. 10, 2012.
Notification of Transmittal of the International Search Report and the Written Opinion of the International Searching Authority, or the Declaration, PCT/US2016/041983, dated Oct. 17, 2016, 18 pages.
Communication pursuant to Article 94(3) EPC, European Patent Application No. 11 801 896.9, dated Jun. 15, 2018, 6 pages.

* cited by examiner

SYSTEMS AND COMPUTER PROGRAM PRODUCTS FOR MEASURING AIRFLOW RATES IN HEATING, VENTILATING, AND AIR CONDITIONING (HVAC) DUCTS AND HVAC SYSTEMS INCLUDING THE SAME

CLAIM OF PRIORITY

The present application claims priority to U.S. Provisional Application No. 61/416,500, filed Nov. 23, 2010, the disclosure of which is hereby incorporated herein by reference as if set forth in its entirety.

FIELD

The present inventive concept relates generally to heating, ventilating and air conditioning (HVAC) systems and, more particularly, to measuring airflow rates in HVAC ducts.

BACKGROUND

Heating, ventilating and air conditioning (HVAC) systems typically include a variety of different components to provide a complete heating and/or cooling cycle. These systems may include, for example, heat pumps, furnaces, compressors, fans, heat exchangers, one or more air ducts, air handlers and the like. These systems typically have a control device to receive control signals to operate the system to condition a space by heating or cooling the space to a desired temperature. The control devices of the system are generally inter-connected to a thermostat that sends electronic signals to the various control devices based on a comparison between a desired temperature for the conditioned space and the actual temperature of the space.

Efficient operation of these HVAC systems can be very difficult due to the multiple variables that effect operation thereof. For example, humidity, temperature, pressure, cleanliness and the like can all effect performance of the HVAC system.

SUMMARY

Some embodiments of the present inventive concept provide an airflow measurement system configured to be received in a duct of a heating, ventilating and air conditioning (HVAC) system. The air flow measurement system includes a housing; and at least one cell positioned in the housing, the at least one cell being configured such that air flows through the at least one cell when the flow measurement system is positioned in the duct of the HVAC system, wherein at least one of the at least one cell includes a self-heated thermistor.

In further embodiments of the present inventive concept, the self-heated thermistor may be a thermistor pair including both s self-heated thermistor and a reference thermistor. The at least one cell may include a plurality of cells and each of the plurality of cells may include a tube that is configured to allow air to flow through the tube.

In still further embodiments, the at least one cell is a plurality of cells and wherein each of the plurality of cells further may include at least one of a humidity sensor and a pressure sensor.

In some embodiment, the self-heated thermistor may be positioned near a downstream end of a corresponding cell and the reference thermistor may be positioned upstream of the heated thermistor.

In further embodiments, the self-heated thermistor may be positioned near a downstream end of a corresponding cell and the reference thermistor may be positioned adjacent to the self-heated thermistor having a partition therebetween.

In still further embodiments, the at least one cell may be a plurality of cells and each of the plurality of cells may include a thermistor pair.

In some embodiments, the at least one cell may be a plurality of cells and less than all of the plurality of cells may include a thermistor pair.

In further embodiments, the at least one cell is a plurality of cells and the housing including the plurality of cells may be configured to be removed from the duct and replaced by a similar housing. The high-resolution system including self heated thermistors in all the plurality of cells may be replaced by a lower resolution system including self-heated thermistors in less than all of the plurality of cells.

In still further embodiments, the at least one cell may be a plurality of cells and the plurality of cells may have one of a circular, rectangular, square or hexagonal cross-section.

In some embodiments, the at least one cell may be a plurality of cells and each of the plurality of cells has a length in the direction of air flow in the duct of about 4.0 inches and a cross section having a diameter of about 1.0 inch.

In further embodiments, the system may be configured to filter, condition, straighten and measure the air flow in the duct.

Still further embodiments of the present inventive concept provide an HVAC system including at least one duct; an airflow measurement system positioned in the duct, the airflow measurement system including at least one thermistor pair including a self-heated thermistor and a reference thermistor; a power module configured to regulate a variable amount of power delivered to the self-heated thermistor; an analog to digital convertor (ADC) configured to receive a non-linear output of the ADC; a calculation module configured to receive an output of the ADC and calculate data used to control air flow in the HVAC system.

In some embodiments, the system may further include a measurement module configured to continuously measure the amount of power being delivered to the self-heated thermistor. The power module may be further configured to adjust the amount of power delivered to the self-heated thermistor responsive to the measured power to maintain a highly functional system.

In further embodiments, the measurement module may be configured to continually measure the amount of power delivered to the heated thermistor, a resistance of the self-heated thermistor and a resistance of the reference thermistor.

In still further embodiments, the calculation module may be further configured to determine temperatures of the self-heated thermistor and the reference thermistor using a temperature-resistance relationship of the thermistors; comparing the temperature of the self-heated thermistor to a temperature of a reference thermistor; and determining an ambient temperature based on the comparison.

In some embodiments, the calculation module may be configured to calculate a temperature rise based on a difference between the temperature of the self-heated thermistor and the temperature of the reference thermistor.

In further embodiments, the calculation module may be further configured to calculate the airflow rate based on the temperature rise, the amount of electrical power delivered to the self-heated thermistor and coefficients determined during system calibration.

In still further embodiments, the system may further include a filter positioned upstream of the air flow measurement system.

Some embodiments of the present inventive concept provide a computer program product for measuring air flow in an HVAC system. The computer program product includes a non-transitory computer readable storage medium including computer readable program code embodied therein. The computer readable program code includes computer readable program code configured to receive data collected in an HVAC system using a high-resolution system including at least one thermistor pair; and computer readable program code configured to calculate configuration details for the HVAC system based on the received collected data associated with the HVAC system and data associated with other HVAC systems provided by a centralized reference model.

In further embodiments, the computer program product may further include computer readable program code configured to regulate a variable amount of power delivered to the self-heated thermistor and provide a non-linear output of the self-heated thermistor to an analog to digital convertor (ADC); and computer readable program code configured to receive an output of the ADC and calculate data used to control air flow in the HVAC system.

In still further embodiments, the computer program product may further include computer readable program code configured to continuously measure the amount of power being delivered to the self-heated thermistor; and computer readable program code configured to adjust the amount of power delivered to the self-heated thermistor responsive to the measured power to maintain a highly functional system.

In some embodiments, the computer program product may further include computer readable program code configured to continually measure the amount of power delivered to the heated thermistor, a resistance of the self-heated thermistor and a resistance of a reference thermistor.

In further embodiments, the computer program product may further include computer readable program code configured to determine temperatures of the self-heated thermistor and the reference thermistor using a temperature-resistance relationship of the thermistors; computer readable program code configured to compare the temperature of the self-heated thermistor to a temperature of a reference thermistor; and computer readable program code configured to determine an ambient temperature based on the comparison.

In still further embodiments, the computer program product may further include computer readable program code configured to calculate a temperature rise based on a difference between the temperature of the self-heated thermistor and the temperature of the reference thermistor.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the inventive concept. In the drawings.

DETAILED DESCRIPTION

In the following detailed description, numerous specific details are set forth in order to provide a thorough understanding of the inventive concept. However, it will be understood by those skilled in the art that the present inventive concept may be practiced without these specific details. In other instances, well-known methods, procedures, components and circuits have not been described in detail so as not to obscure the present inventive concept.

As discussed in the background, efficient management of Heating, Ventilating, and Air Conditioning (HVAC) systems can be very difficult due to the variety of variables that can affect the output. Embodiments of the present inventive concept are directed to systems for measuring air flow rates in HVAC ducts using self-heated thermistors in the air stream. In particular, HVAC systems include ducts or pathways through which air flows to regulate the temperature of a closed space, for example, a house or office building, provide ventilation to the closed space and the like. These ducts can have various shapes and size, for example, ducts can be round or rectangular. The path of the duct may include various twists and turns, for example a 90 degree turn at a corner or a 45 degree change in direction. The variability of the path of the duct may make it difficult to regulate the air flow through the HVAC system in an efficient manner.

Figure 1:
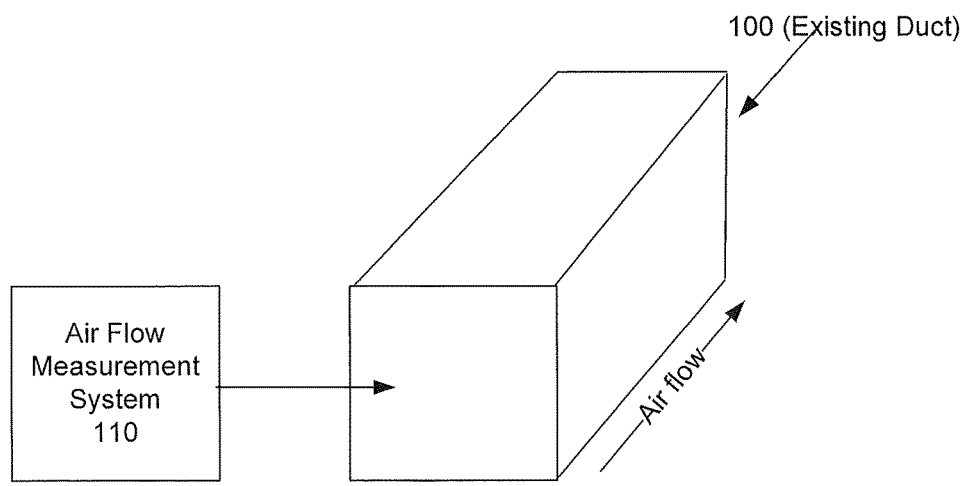
FIG. 1 is a block diagram illustrating a duct of a heating, ventilation and air conditioning (HVAC) system and an air flow measurement system in accordance with some embodiments of the present inventive concept.

Accordingly, as illustrated in FIG. 1, in some embodiments of the present inventive concept provide an air flow measurement system 110 that is configured to be installed in ducts 100 of an existing HVAC system. In other words, it is configured to fit within the confines of existing ducts 100. Thus, the air flow measurement system 110 can be installed, uninstalled, replaced, repaired and the like without effecting the overall HVAC system. As will be discussed further herein, the air flow measurement system 110 in accordance with some embodiments collects "data" using various sensors, for example, self-heating thermistors, reference thermistors, humidity sensors, pressure sensors and the like. As used herein "data" refers to any data that can be sensed in an HVAC system that could be used to improve calibration of the HVAC system. For example, air temperature, temperature of nearby surfaces, relative humidity, air flow (circulation), radiant surface temperatures (walls, floors, ceilings, windows), air circulation patterns (supply and return register operation, damper positions), air exchange rate, ventilation rate, combustion byproducts ($SO_X$, $NO_X$, CO, $CO_2$, and the like), dust loads (PPM 2.5, PPM 10), air flow (draft) in open chimneys, room pressure differentials, air filter loads (air flow through filters) and the like. An amount of power supplied to the self-heated thermistor is regulated and this power value and the data collected from the various sensors are used to calibrate the system to achieve efficient operation thereof as will be discussed below with respect to FIGS. 1 through 7.

A thermistor is a passive electronic component whose electrical resistance varies with temperature, with a known relationship between resistance and temperature. In other words, the relationship between resistance and temperature is known for a given make and model of thermistor. The relationship can depend, for example, on the materials used, the size and shape of the resistive material, and presumably other factors known to the manufacturer of the thermistor. It will be understood that embodiments of the present inventive concept can be used with a wide range of thermistors from different manufacturers, and so the exact relationship is not known for all possible embodiments, but only in particular exemplary embodiments of the inventive concept. The manufacturer of the thermistor typically provides the relationship in the form of a table of values at each temperature. Typically, a user of embodiments of the present inventive concept would use the table of values to determine the relationship. There are also some equations which can be used instead, though they are approximations. For example, the Steinhart-Hart equation is often used for this purpose as discussed at World Wide Web address en.wikipedia.org/wiki/Thermistor.

When an electric current is passed through a thermistor, it creates a self-heating effect within the thermistor, which is a function of the amount of current and the resistance of the thermistor. This heat must be dissipated by the thermistor. In some embodiments discussed herein, the heat is dissipated into the air stream within the duct. The rate of dissipation increases when the air flow increases. Therefore, when the air flows slowly, heat dissipates slowly and the temperature of the self-heated thermistor rises. Similarly, when air flow increases, heat dissipation increases and the thermistor temperature falls.

As discussed above, in some embodiments of the present inventive concept, an amount of electrical power supplied to the self-heated thermistor is controlled. Thus, by driving the self-heated thermistor with a known amount of electrical power and obtaining a measured resistance, the temperature of the self-heated thermistor can be calculated using the known temperature-resistance relationship.

The temperature of the self-heated thermistor can be compared to a temperature read out by a non-heated reference thermistor to determine the ambient temperature. The difference between the temperature of the self-heated thermistor and the temperature of the reference thermistor is the temperature rise due to self-heating. If the temperature rise and the amount of electrical power generating that rise are known, along with coefficients determined during system calibration, then the air flow rate can be calculated. The quantity being measured, roughly, is the rate of flow of mass. This is subtly different than the typical quantity considered in HVAC applications, which is volumetric flow rate, for example, cubic feet per minute. Mass flow rate is of more direct applicability, however, to calculations of HVAC system performance.

Figure 2:
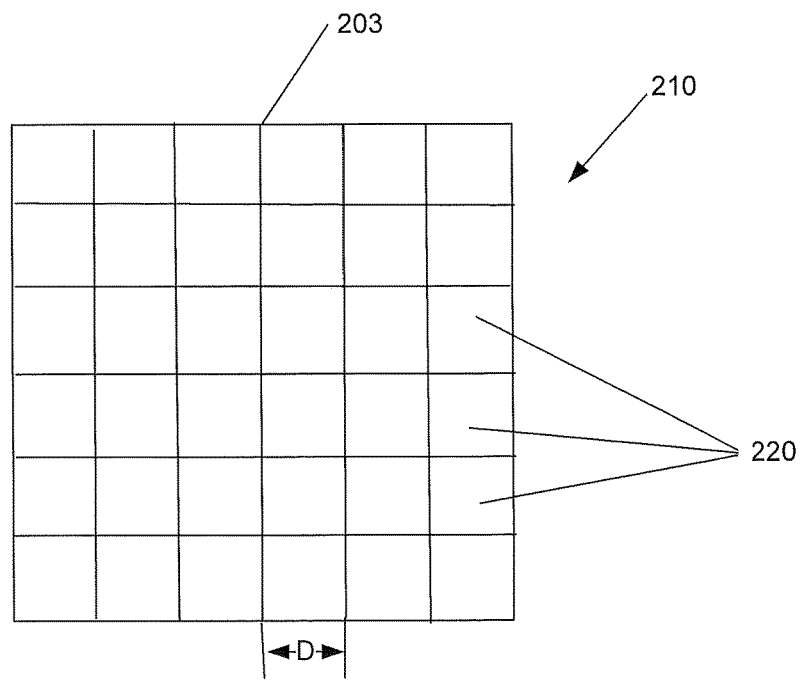
FIG. 2 is a cross-section of an air flow measurement system including a plurality of cells in accordance with some embodiments of the present inventive concept.
Figure 3A:
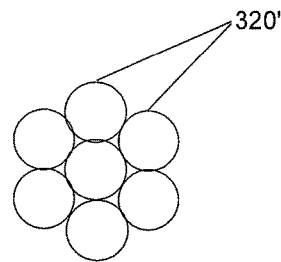
FIGS. 3A and 3B are diagrams illustrating alternative cross sections of cells in accordance with some embodiments of the present inventive concept.
Figure 3B:
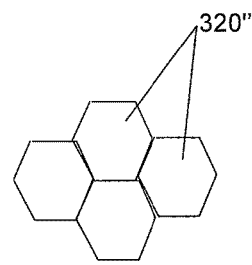

Referring now to FIG. 2, illustrating a cross section of the air flow measurement system 210 that is configured to be positioned in the duct of an existing HVAC system will be discussed. In order to obtain accurate measurements using the air flow measurement system 210 in accordance with embodiments discussed herein, the air flow across the heated thermistor should be substantially laminar (not turbulent). Turbulent flow may cause inaccurate readings. To aid in making the air flow substantially laminar, embodiments of the present inventive concept include an array of "cells" 220 in a housing 203. Each of the cells 220 includes a pipe or tube of various cross-sectional shapes and dimensions. The cells 220 illustrated in FIG. 2 are square and form a grid-like pattern. However, embodiments of the present inventive concept are not limited to this configuration. For example, as illustrated in FIGS. 3A and 3B, the cells may also be, but are not limited to, circular 320' and hexagonal (in a honeycomb layout) 320". Only a portion of the cells 320' and 320" are illustrated in FIG. 3, however, it will be understood that when these cells 320' and 320" are included in a housing 203 of the air flow measurement system, they will fill the space similar to the cells 220 illustrated in FIG. 2.

Referring again to FIG. 2, the dimensions of the cells may vary depending on the HVAC system in which they are installed. In some embodiments, for example, the cells may be about 4.0 inches in length L (going into the page of FIG. 2 in the direction of the air flow) and about 1.0 inch in cross-sectional diameter D, but will vary in different embodiments of the present inventive concept. The small cells 220 act as a flow conditioner and straightener, so that on the downstream end of each cell 220, the flow will be substantially laminar.

Figure 4:
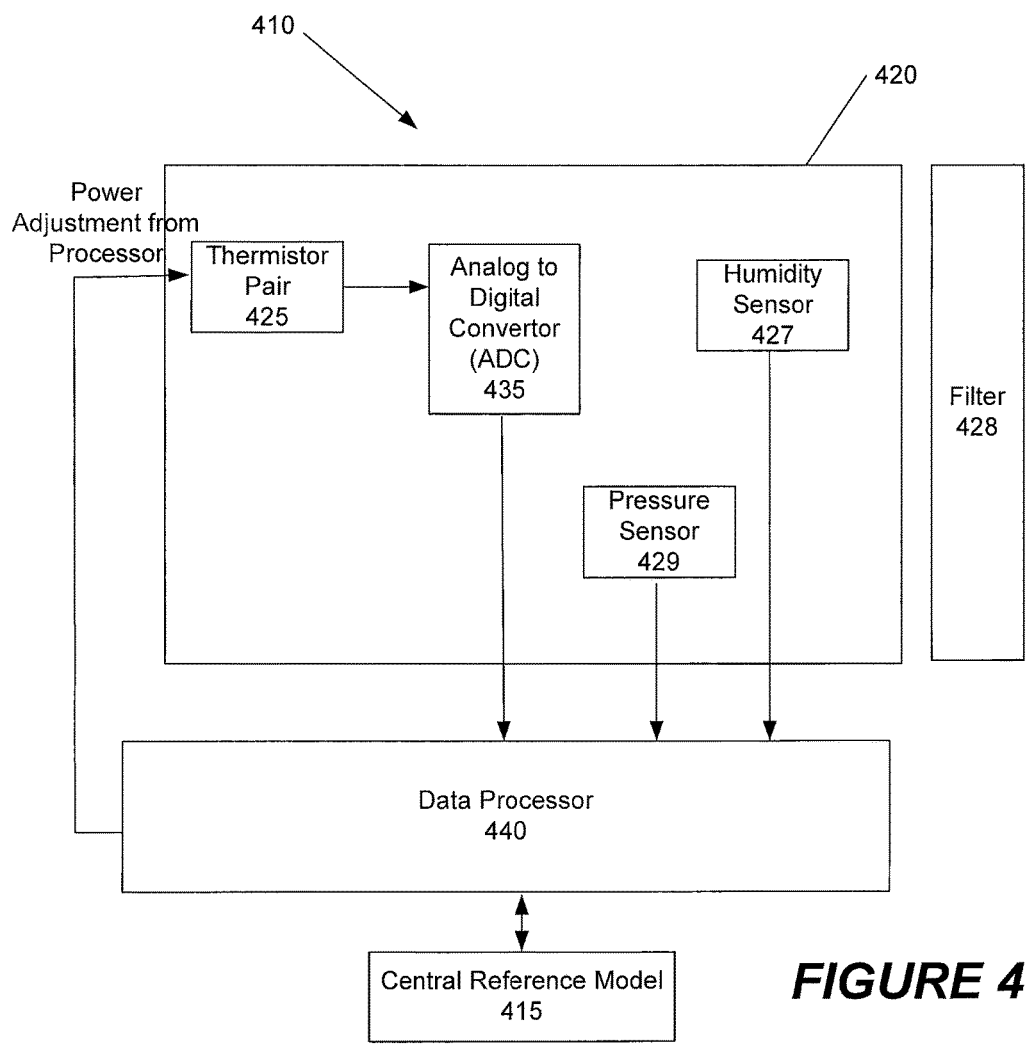
FIG. 4 is a block diagram of a system in accordance with some embodiments of the present inventive concept.

Referring now to FIG. 4, an airflow measurement system 410 including cells 420 in accordance with some embodiments of the present inventive concept will be discussed. As illustrated in FIG. 4, a cell 420 in accordance with some embodiments of the present inventive concept may include a thermistor pair, an analog to digital converter 435, a humidity sensor 427 and a pressure sensor 429. Although the cell 420 of FIG. 4 is illustrated as including all of these components, embodiments of the present inventive concept are not limited to this configuration. For example, the humidity and/or pressure sensor may be removed. Furthermore, as will be discussed below, not all cells 420 in the grid (FIG. 2, 210) may include a thermistor, which may reduce cost of the system.

As illustrated in FIG. 4, a cell 420 may include a "thermistor pair" 425, including both a self-heated thermistor and a reference thermistor. In some embodiments, the self-heated thermistor may be are placed near the downstream end of the cell 420. The reference thermistor may be placed upstream of the heated thermistor, so that it is not affected by heat conducted from the heated thermistor. However, in some embodiments, the reference thermistor may be positioned next to the self-heated thermistor, but may be separated from it by a partition or vane, which blocks direct radiative transfer of heat to the reference thermistor.

In some embodiments, several thermistor pairs 425 are distributed over a cross-section of the duct, to measure air flow at multiple points. This is useful because air flow is not typically evenly distributed within the duct. By measuring at multiple points, a more accurate measurement of the total flow through the cross-section can be obtained.

As discussed above, in some embodiments, not every cell 420 will include a thermistor pair. The flow within strategically chosen cells 420 can be measured, and from this measured data, the flow rate in the other cells that do not have a thermistor pairs 425 therein can be extrapolated. However, as discussed above, the housing/electronics of the air flow measurement system 410 can be removed and replaced "in the field." Thus, it is possible in accordance with some embodiments to use a high-resolution version of the flow measurement system 410, in which every cell includes a thermistor pair 425 to perform a field calibration of the entire duct system as installed. After the system is calibrated, the high-resolution version of the system 410 may be removed and replaced with a system where less than all the cells 420 include thermistor pairs 425.

The high-resolution calibration may improve the accuracy of the extrapolation from measured cells to unmeasured cells, by characterizing the flow pattern in the duct system as installed with the high-resolution device. This field calibration can be repeated as often as desired, for example, during annual HVAC system maintenance. The high-resolution measurement can also be used to determine, for a given duct system as installed, what the ideal measurement location or locations within the duct cross-section are in order to provide the most accurate extrapolation to the entire duct cross-section. In other words, the calibration process may, identify which cells 420 of the system 410 should include the thermistor pairs 425 to obtain the best measurements/results.

As further illustrated in FIG. 4, in some embodiments of the inventive concept, there may also be a humidity sensor 427 placed in one or more of the cells 420. Humidity measurement, in addition to being a useful measurement in HVAC applications, can also be used to improve the accuracy of the flow measurement by compensating for the effect of humidity on air density and thermal transfer from the heated thermistor to the air stream. As illustrated, some embodiments may also include an absolute (barometric) air pressure sensor 429 for the purposes of calculating air density, or some embodiments may use the altitude above sea level of the installation to approximate air pressure and density.

Over time, dust and debris carried by the air stream can be deposited on the thermistor, which change the heat dissipation characteristics of the thermistors and, therefore, invalidates the calibration of the system. Thus, in some embodiments discussed herein, a filter 428 is positioned directly upstream of the flow measurement device 410. In some embodiments of the present inventive concept, a standard 4.0 inch (depth) pleated media filter may be positioned directly upstream of the flow measurement device to remove airborne particles. This filter 428 is also configured to be interchangeable, and can be cleaned or replaced at regular intervals as it accumulates dirt. The flow measurement system 410 can be used to determine, indirectly, when the filter 428 needs to be changed. The presence of the filter 428 may also provide a secondary benefit of removing much of the air turbulence and non-uniformity before it even reaches the cells 420, resulting in an improved even, laminar flow at the point of measurement.

As discussed above with respect to FIG. 2, in some embodiments, the system 210 consists of a housing 203 with a rectangular (or square) cross-section. In some embodiments, the housing 203 may be about 8.0" deep. In some embodiments, the housing 203 may be installed permanently into the duct system and the cells 220 may be interchangeable. The house 203 may be configured to accommodate both the 4.0" pleated media filter (428, FIG. 4) and a 4.0" flow measurement device 210. The dimensions given here are the depth dimension; i.e., the dimension parallel to the direction of air flow. The height and width may vary according to the requirements of the installation; higher air flow volumes will require larger cross-sections. Although embodiments may be discussed herein with respect to the housing 203 being square or rectangular, embodiments of the present inventive concept are not limited to this configuration. For example, the housing may be circular without departing from the scope of the present inventive concept.

Embodiments of the present inventive concept go beyond the basic principle of operation of flow measurement using a self-heated thermistor compared to a reference thermistor. Embodiments of the present inventive concept offer various advantages, some of which will be discussed below.

Referring again to FIG. 4, aspects of the system 410 and cells 420 will now be discussed in detail. First, the electronics and signal conditioning in accordance with some embodiments of the present inventive concept will be discussed. The literature contains many references that discuss various methods of electrically driving thermistors to obtain the desired signal characteristics, which are generally known to those skilled in the art. Generally, these are analog circuits which attempt to obtain a linear signal; that is, an analog output which is nearly directly proportional to the amount of flow. Linear signals such as this may be desirable in analog systems, but thermistors are inherently non-linear in their response, and furthermore the relationship between air flow rate and heat dissipation is also non-linear.

Thus, in accordance with some embodiments of the present inventive concept, the complexity of attempting to achieve linearity in the analog domain may be avoided by doing the majority of the signal processing in the digital domain. The (non-linear) outputs of the thermistors are measured by an analog-to-digital convertor (ADC) 435, and a processor 440 is used to perform calculations related to air flow measurement and regulation.

Furthermore, much of the literature is concerned with the way in which power is delivered to the self-heated thermistor. Various approaches are possible: constant current, constant voltage, constant power, and constant temperature rise are typically discussed. Each of these approaches adjusts the current and/or voltage being delivered to the heated thermistor to maintain some quantity constant. This simplifies calibration, particularly in analog systems.

Systems in accordance with some embodiments discussed herein also put the software in control of driving the thermistor. As illustrated in FIG. 4, the thermistor 425 received a power adjustment signal from the processor 440. The processor 440 is configured to drive the thermistor with a variable amount of power input, so as to control the output of the thermistor relative to the ADC 435. In particular, most ADC's have a linear response, i.e. a single step in the digital output corresponds to a given change in input voltage, and the amount of change per digital step is the same throughout the entire voltage range.

In embodiments of the present inventive concept, the input to the ADC 435 is non-linear, due to the fact that the relationship between temperature and resistance in the thermistor is non-linear, and also that the measurement circuit itself will typically have a non-linear characteristic. Thus, under some conditions of airflow, ambient temperature, and amount of power delivered to the heated thermistor, a given change in airflow will create a very small change in voltage, and under other conditions of temperature and pressure, it will create a larger change in voltage. A small change in voltage may be too small to be detected by the ADC 435, if it is beneath the resolution of the ADC 435, while a larger change would be detectable. So the effective resolution of the device, i.e. the smallest detectable change in airflow, changes based on different conditions of airflow, ambient temperature, and the amount of heating power delivered to the self-heated thermistor. By adjusting the heating power of the thermistor, the effective resolution of the device can be changed at a given airflow and ambient temperature, and embodiments of the present inventive concept do so in such a manner as to increase or possibly maximize the effective resolution under any given conditions of airflow and ambient temperature. In practice, this entails using more heating power when airflow is high and less heating power when airflow is low. This is a simplified example. The actual process is more precise than this and the details depend on the characteristics of the particular thermistor being used, the measurement circuit, and the ADC 435.

Thus, because the ADC 435 is measuring a non-linear signal received from the thermistor, the resolution of the system varies, depending on dynamic parameters of the system. But one of those dynamic parameters is the amount of power being delivered to the thermistor. Thus, by controlling this parameter with the processor 440, the overall resolution of the system with respect to air flow measurement can be increased or possibly maximized. The power being delivered to the thermistor is continually measured and adjusted by processor 440 to maintain this optimal performance.

Normally, a highly variable and dynamic control loop as discussed herein would pose a problem for calibration of the system. Temperature rise in the heated thermistor is a function of both air flow rate and power delivered to the thermistor. If power delivered to the thermistor varies according to a complex and dynamic function running on the processor, a simplistic system calibration is not possible. Furthermore, because of the finite response time of the thermistor itself (due to its own thermal mass), whenever power input changes, sensor output will change only over time as the system comes into equilibrium. If power input is changing constantly, and also air flow is changing constantly, the system may never reach equilibrium. Therefore, a dynamic model in accordance with some embodiments is necessary.

In particular, the processor 440 is configured to continually measure three quantities: power input to the self-heated thermistor, resistance of the self-heated thermistor, and resistance of the reference thermistor. As discussed above, temperatures of the thermistors can be calculated based on the resistances thereof and temperature rise can be calculated from the obtained temperatures. The response time characteristics of the thermistor are determined during an initial calibration procedure and are assumed not to change during the life of the system. From all of these quantities, a dynamic (i.e., time-varying) model of the heat dissipation of the thermistor is calculated by the processor 440, and from that, the dynamic air flow is determined. The governing equation of the static equilibrium condition is:

$$P_t = k(T_r - T_a),\qquad \text{Equation (1)}$$

where $P_t$ is the total power dissipated by the thermistor (i.e., the rate of energy dispersed; the first derivative of energy with respect to time), k is the heat dissipation factor (units of power per degree; e.g., milliwatts per degree Kelvin), $T_r$ is the temperature of the heated thermistor, and $T_a$ is the ambient air temperature (as measured by the reference thermistor). The heat dissipation factor (k) is itself a time-varying function of airflow and the static characteristics of the thermistor being used. This relationship between airflow and the heat dissipation factor (k) is characterized for each thermistor (or each make and model of thermistor) during initial system calibration.

Of the four quantities in this equation, the system measures three ($P_t$, $T_r$, and $T_a$) and from those calculates the fourth (k), and then using the calibrated relationship between k and airflow can calculate airflow. However, to account for the time-varying nature of these quantities, in which power, ambient temperature, and airflow all change over time, a differential version of the above equation (differentiated with respect to time) must be employed, and the time constant of the system must be known. The time constant is primarily a function of the heat capacity of the heated thermistor, and can be measured during system calibration. By sampling the three measured quantities rapidly over time and employing a numerical approximation methods of integration and differentiation, a time-varying measurement of airflow can be computed. These numerical methods and calculations may be carried out in real-time on the processor 440. Those skilled in the art will know of numerous possible numerical methods of integration and differentiation, any of which can be employed in embodiments of the present invention without materially affecting the principle of operation.

Most systems are based on a "black box" model of an equilibrium relationship between sensor output and air flow rate. Systems in accordance with embodiments discussed herein are based on a dynamic, physical model of the system, where all measured quantities are considered as time-varying functions. The benefit gained from this is the ability to keep the system at a maximum resolution in all conditions: high flow, low flow, and varying ambient temperatures. This is possible because of the fully digital measurement and control loop, and the physical model (reference model).

Field calibrations and interchangeability in accordance with some embodiments of the present inventive concept will now be discussed. The physical design of systems in accordance with various embodiments of the present inventive concept may be of considerable practical importance. The rectangular cross-section of the housing 203 is familiar to HVAC tradesmen and is easily integrated into various duct systems, including retrofits into existing systems. The entire system 210, 410 may be only 8.0" deep, allowing installation where limited space is available. Within 8.0" of duct length, the system discussed herein filters, conditions, straightens, and measures the air flow. However, flow conditioning and straightening is never perfect, and the exact details of the duct system upstream and, to a lesser extent, downstream of the system will have an effect on the cross-sectional distribution of flow. Thus, embodiments of the present inventive concept are configured to take measurements at multiple points within the system.

As discussed above, there is a cost associated with each point of measurement. Therefore, to make the system economical, embodiments discussed herein allow the flow measurement module to be interchangeable in the field, so that a high-resolution module (including thermistors/sensors in each cell 220,420) can be slid into the housing, measurements made to characterize the flow with fine spatial resolution, and then the high-resolution module removed and replaced with a low-resolution module (less than all the cells include thermistors/sensors), which uses the high-resolution snapshot to extrapolate from one or a few measurement points to the entire cross-section. Because the basic shape of the duct system does not change much over time, the flow distribution also will not change much, and so the calibration should remain valid for quite some time. The calibration can be easily repeated during annual HVAC maintenance, or whenever (remotely) observed changes indicate that there has been a change in flow pattern. For example, if more than one point in the cross-section is being measured, the relationship of the flow rates at those points, relative to one another, should remain the same, so long as the duct characteristics have not substantially changed. Therefore, a change in the relative flows at the different points of measurement can be used to evaluate when a new high-resolution calibration of the system is desirable.

In embodiments in which more than one point of measurement is present, the inventive concept can take advantage of this redundancy in the event that one or more thermistor/sensor fails, but at least one thermistor/sensor continues to function. In these embodiments, it is still possible to extrapolate, using the high-resolution calibration or assumed flow distribution, even from one sensor to the entire cross-section, though in general with reduced accuracy.

In some embodiments, the low-resolution module may be field configured so that the installer, based on the results of the high-resolution calibration, places measurement units within only the most important cells for that particular duct configuration. The processor 440 may be configured to implement the cell selection. In particular, the processor 440 may be configured to automatically determine which cells are most relevant and provide the highest-quality extrapolation to the entire cross-section of the system.

In some embodiments, the data collected during high-resolution calibration may be transmitted to and stored in a central database which accumulates such data from many installations of the inventive concept. These observations can then be used to create and refine ("teach") a central reference model 415 which, among other things, can be used to determine, for a given duct system geometry and HVAC system configuration (fan type and power, nominal flow, and type of air filter, if any), the optimal or near-optimal placement of sensors within the duct cross-section, so that the need for a high-resolution calibration in every installation may be reduced. This can provide significant cost savings over a large number of installations, as high-resolution calibration would only be required in a fraction of the installations, to use for refinement and verification of the central reference model. Central reference models 415 for use in HVAC systems are discussed in commonly assigned U.S. Pat. No. 7,839,275, the content of which is hereby incorporated herein by referenced as if set forth in its entirety.

In some embodiments, the central reference model may be used to send a ready-made module to each installation with sensors already located in optimal locations as predicted by the model. Thus, field configuration of the sensor array may not be necessary.

Furthermore, systems designed in accordance with embodiments of the present inventive concept allow the flow modules to be easily replaced, to deal with long-term drift due to component wear and tear, or accumulation of dirt on the thermistors. In some embodiments, it may be possible to replace both the sensor cell array and the associated electronics (thermistor driving, signal conditioning, ADC, etc.), or replace only the sensor array, or only the electronics, in order to respond appropriately to different rates of drift in the different components.

Further properties/characteristics of the present inventive concept in accordance with various embodiments will now be discussed. Placement of the air flow measurement system 210, 410 behind a filter may allow measurement of the efficiency of the filter, as a function of the measured total air flow, as well as highs and lows in the flow distribution over the entire filter cross section. This has the advantage that filter efficiencies are dependent on the actual air flow, and not the total flow across the filter. The temporal and spatial characteristics of the air flow can be observed as a time series over the life of the filter, and in near real-time, if necessary. If a filter reaches critical levels of inefficiency in certain spots that would have a negative impact on the efficiency of the HVAC system, or on the resulting air quality (particle content of the air downstream of the filter), these can be detected in near real-time, and corrective actions (alarms, replacement requests) can be taken.

Air flow measurement systems in accordance with embodiments discussed herein have the ability to detect temporal and spatial variations on the air flow for the entire cross section. This allows detection of any temporal patterns at any and all individual locations over the entire cross section, or areas (subsets) of the cross section, and determine resulting total airflows over specific time periods by averaging over the sum total of observed patterns for that time frame.

Systems in accordance with embodiments discussed herein are also able to observe deviations between any and all cells of the device, calculate first derivatives, and derive evolving pattern changes fairly quickly; these could, for example, indicate that the filter that is located upstream of the device may have developed a defect, such as a hole or tear, or is filling up in a non-homogeneous way for different locations on the cross section of the filter.

Observed performance data for the device or for the filter can be used to derive performance reference models for the device or the filter. These reference models can be used to optimize the overall performance, such as the efficiency, or the air flow resistance, etc., of the device or the filter, or the combination of both.

If the device is located in an outside air intake, changes in the outside air quality can be detected, for example by comparing previous trends of particle accumulation on the air filter with actual observations and first derivatives thereof. The amount of outside air brought into the house for ventilation purposes can then be adjusted accordingly, or shut down completely if the dust or particle count in the incoming air exceeds a certain threshold.

Correlations between observed flows and the relative humidity of the incoming air, and the effect of the humidity on the efficiency of the filter can be taken into account. Temporary variations of the observed filter efficiency due to changes in the humidity of the filtered (incoming) air can therefore be separated from decreases in filter efficiency due to actual (permanent, on-going) particle accumulation.

In some embodiments, the measured air flow may be used in conjunction with a control system, including in some embodiments a model reference adaptive control system connected to a central reference model, in order to control aspects of the HVAC system such as variable-speed fan motors and motorized duct dampers, in order to deliver a desired amount of air flow through the system and/or to specific zones of the structure via motorized duct dampers. This could be used, for example, to facilitate explicit and optimized compliance with the ASHRAE 62.2 standard for building ventilation. This could also be used, for example, in a two-story building which contains only a single HVAC system, in order to balance the air flow to the upper and lower stories according to different conditions, such as heating or cooling.

Figure 5A:
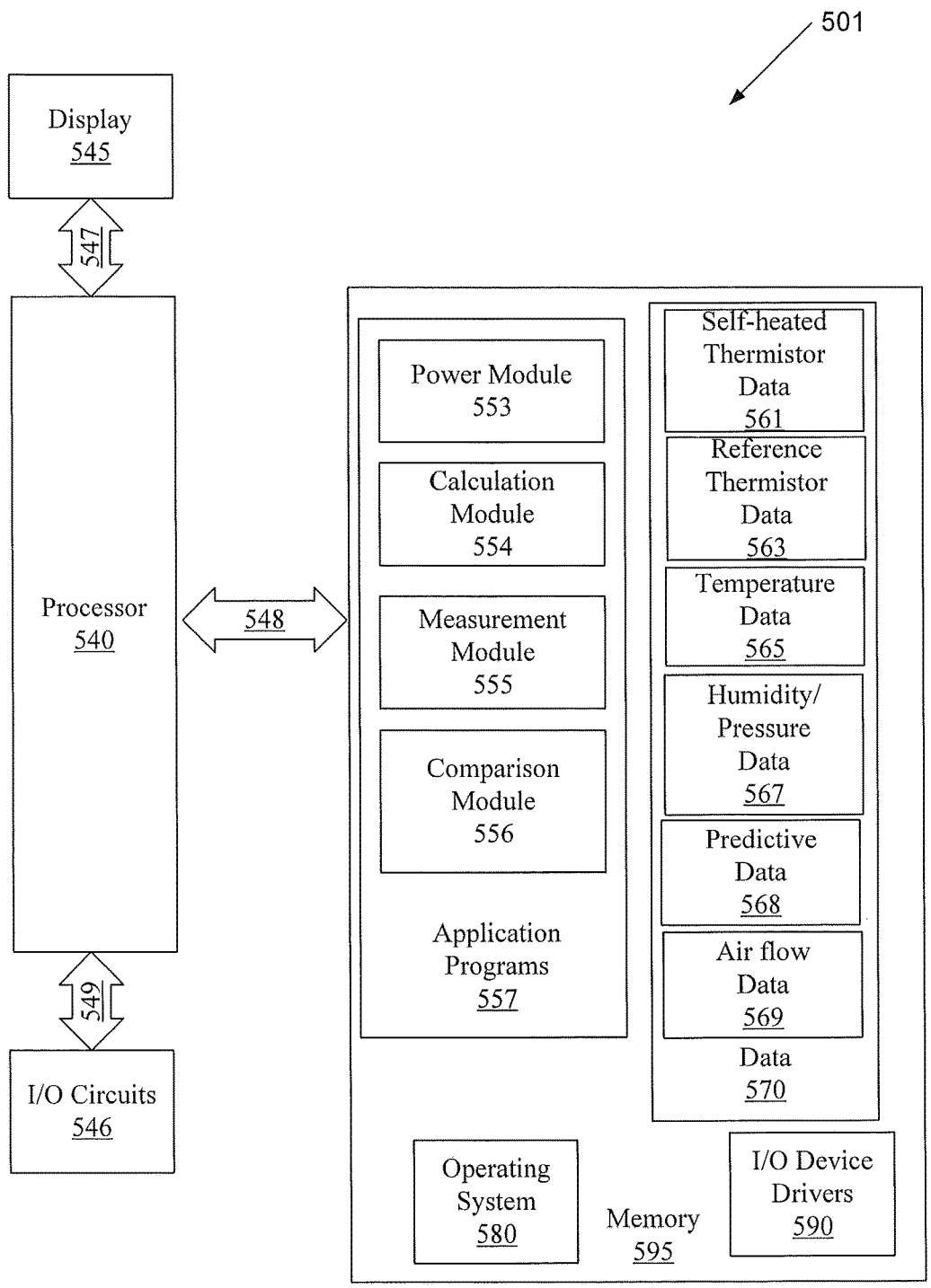
FIG. 5A is a block diagram of a data processing system for use in a building in accordance with some embodiments of the inventive concept.

Details with respect to the data processor 440 will now be discussed with respect to FIG. 5A. As illustrated in FIG. 5A, an exemplary data processing system 501 that may be used to perform calculations, measurements and the like discussed above in accordance with some embodiments of the present inventive concept will be discussed. As illustrated, the data processing system 501 includes a display 545, a processor 540, a memory 595 and input/output circuits 546. The data processing system 501 may be incorporated in, for example, a personal computer, server, router or the like. The processor 540 communicates with the memory 595 via an address/data bus 548, communicates with the input/output circuits 546 via an address/data bus 549 and communicates with the display via a connection 547. The input/output circuits 546 can be used to transfer information between the memory 595 and another computer system or a network using, for example, an Internet Protocol (IP) connection. These components may be conventional components, such as those used in many conventional data processing systems, which may be configured to operate as described herein.

In particular, the processor 540 can be any commercially available or custom microprocessor, microcontroller, digital signal processor or the like. The memory 595 may include any memory devices containing the software and data used to implement the functionality circuits or modules used in accordance with embodiments of the present inventive concept. The memory 595 can include, but is not limited to, the following types of devices: cache, ROM, PROM, EPROM, EEPROM, flash memory, SRAM, DRAM and magnetic disk. In some embodiments of the present inventive concept, the memory 595 may be a content addressable memory (CAM).

As further illustrated in FIG. 5A, the memory 595 may include several categories of software and data used in the data processing system 540: an operating system 580; application programs 557; input/output device drivers 590; and data 570. As will be appreciated by those of skill in the art, the operating system 580 may be any operating system suitable for use with a data processing system, such as OS/2, AIX or zOS from International Business Machines Corporation, Armonk, N.Y., Windows95, Windows98, Windows2000 or WindowsXP from Microsoft Corporation, Redmond, Wash., Unix or Linux. The input/output device drivers 590 typically include software routines accessed through the operating system 580 by the application programs 557 to communicate with devices such as the input/output circuits 546 and certain memory 595 components. The application programs 557 are illustrative of the programs that implement the various features of the circuits and modules according to some embodiments of the present inventive concept. Finally, the data 570 represents the static and dynamic data used by the application programs 557, the operating system 580, the input/output device drivers 590, and other software programs that may reside in the memory 595. As illustrated in FIG. 5A, the data 570 may include, but is not limited to self-heated thermistor data 561, reference thermistor data 563, temperature data 565, humidity/pressure data 567, predictive data 568, and/or airflow data 569 for use by the circuits and modules of the application programs 557 according to some embodiments of the present inventive concept as discussed above.

As further illustrated in FIG. 5A, the application programs 557 include a power module 553, a calculation module 554, a measurement module 555 and a comparison module 556. While the present inventive concept is illustrated with reference to the power module 553, the calculation module 554, the measurement module 555 and the comparison module 556 being application programs in FIG. 5A, as will be appreciated by those of skill in the art, other configurations fall within the scope of the present inventive concept. For example, rather than being application programs 557, the power module 553, the calculation module 554, the measurement module 555 and the comparison module 556 may also be incorporated into the operating system 580 or other such logical division of the data processing system 501, such as dynamic linked library code. Furthermore, the power module 553, the calculation module 554, the measurement module 555 and the comparison module 556 are illustrated in a single data processing system, as will be appreciated by those of skill in the art, such functionality may be distributed across one or more data processing systems. Thus, the present inventive concept should not be construed as limited to the configuration illustrated in FIG. 5A, but may be provided by other arrangements and/or divisions of functions between data processing systems. For example, although FIG. 5A is illustrated as having multiple modules, the modules may be combined into three or less or more modules may be added without departing from the scope of the present inventive concept.

As discussed above, the data processing system 501 may be provided in a building, for example, a residence or office building in accordance with some embodiments of the present inventive concept. The date processing system 501 may be used in combination with the air flow measurement system 210, 410 in accordance with embodiments discussed herein, to regulate air flow in ducts of an HVAC system.

Figure 5B:
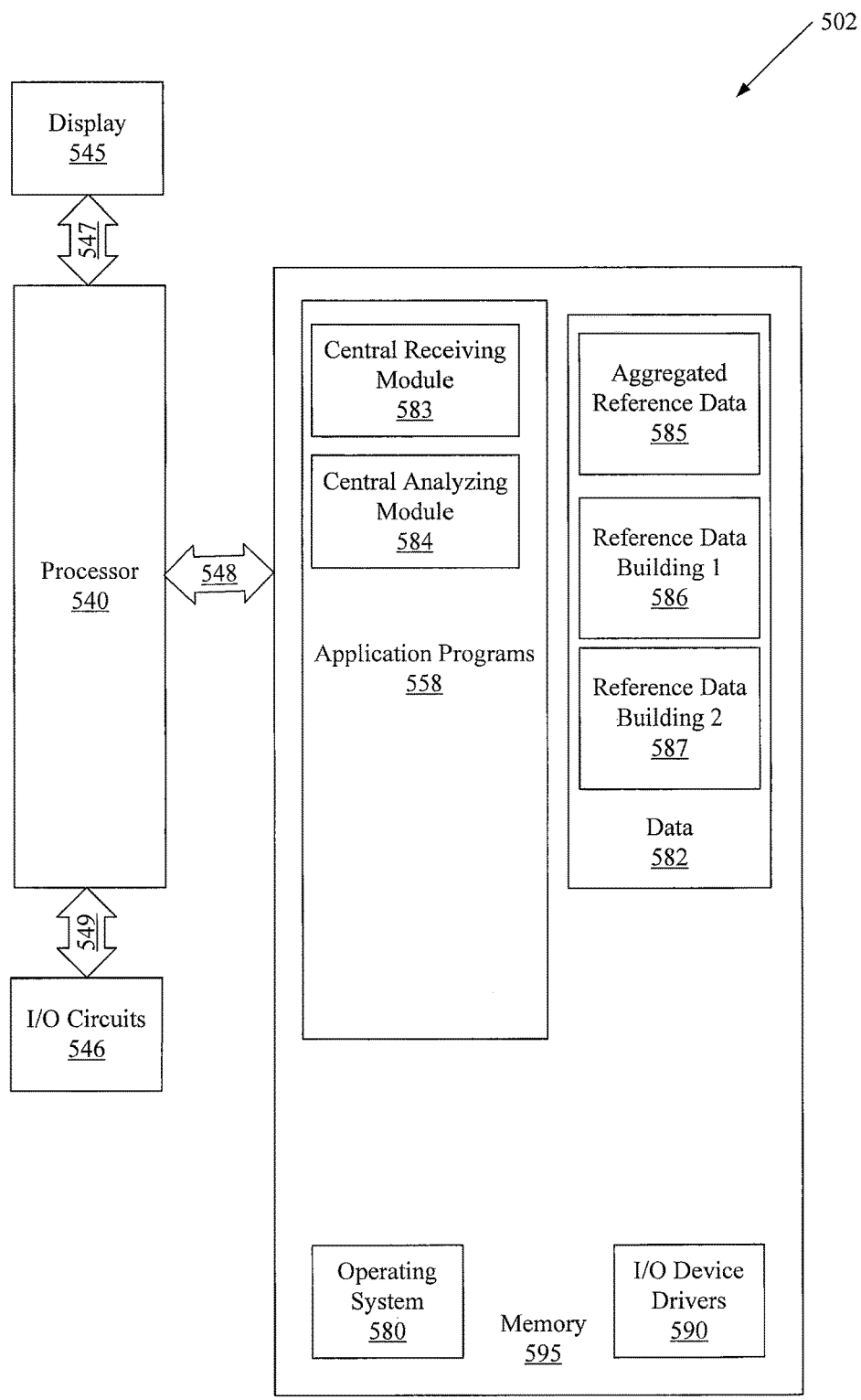
FIG. 5B is a block diagram of a data processing system for use in a central reference model in accordance with some embodiments of the present inventive concept.

Referring now to FIG. 5B, an exemplary central data processing system 502 according to some embodiments of the present inventive concept will be discussed. It will be understood that like numbered elements of FIG. 5A are substantially similar to like numbered elements of FIG. 5B and, therefore, the details with respect to these elements will not be discussed further herein. In particular, only the application programs 558 and the data 582 of FIG. 5B will be discussed in detail. As illustrated in FIG. 5B, the data 582 may include stored aggregated reference data 585, reference data associated with a first building 586 and reference data associated with a second building 587 for use by the circuits and modules of the application programs 558 according to some embodiments of the present inventive concept as discussed herein. It will be understood that, although only reference data associated with two buildings is illustrated, embodiments of the present inventive concept are not limited to this configuration. As discussed above, three or more buildings may be coupled to the central server and, in fact, the more buildings used, the more accurate the reference model.

As further illustrated in FIG. 5B, the application programs 558 include a central receiving module 583 and a central analyzing module 584. While the present inventive concept is illustrated with reference to the central receiving module 583 and the central analyzing module 584 being application programs in FIG. 5B, as will be appreciated by those of skill in the art, other configurations fall within the scope of the present inventive concept. For example, rather than being application programs 558, the central receiving module 583 and the central analyzing module 584 may also be incorporated into the operating system 580 or other such logical division of the data processing system 502, such as dynamic linked library code. Furthermore, while the central receiving module 583 and the central analyzing module 584 are illustrated in a single data processing system, as will be appreciated by those of skill in the art, such functionality may be distributed across one or more data processing systems. Thus, the present inventive concept should not be construed as limited to the configuration illustrated in FIG. 5B, but may be provided by other arrangements and/or divisions of functions between data processing systems. For example, although FIG. 5B is illustrated as having multiple modules, the modules may be combined into one or more modules may be added without departing from the scope of the present inventive concept.

Referring to FIGS. 5A and 5B, the central receiving module 583 is configured to receive the data associated with the buildings and data associated with one or more other buildings. As discussed above, the more building from which data is collected, the more accurate the model and comparisons may be. The central analyzing module 584 may be configured to analyze the received data associated with the building and the one or more other buildings.

Figure 6:
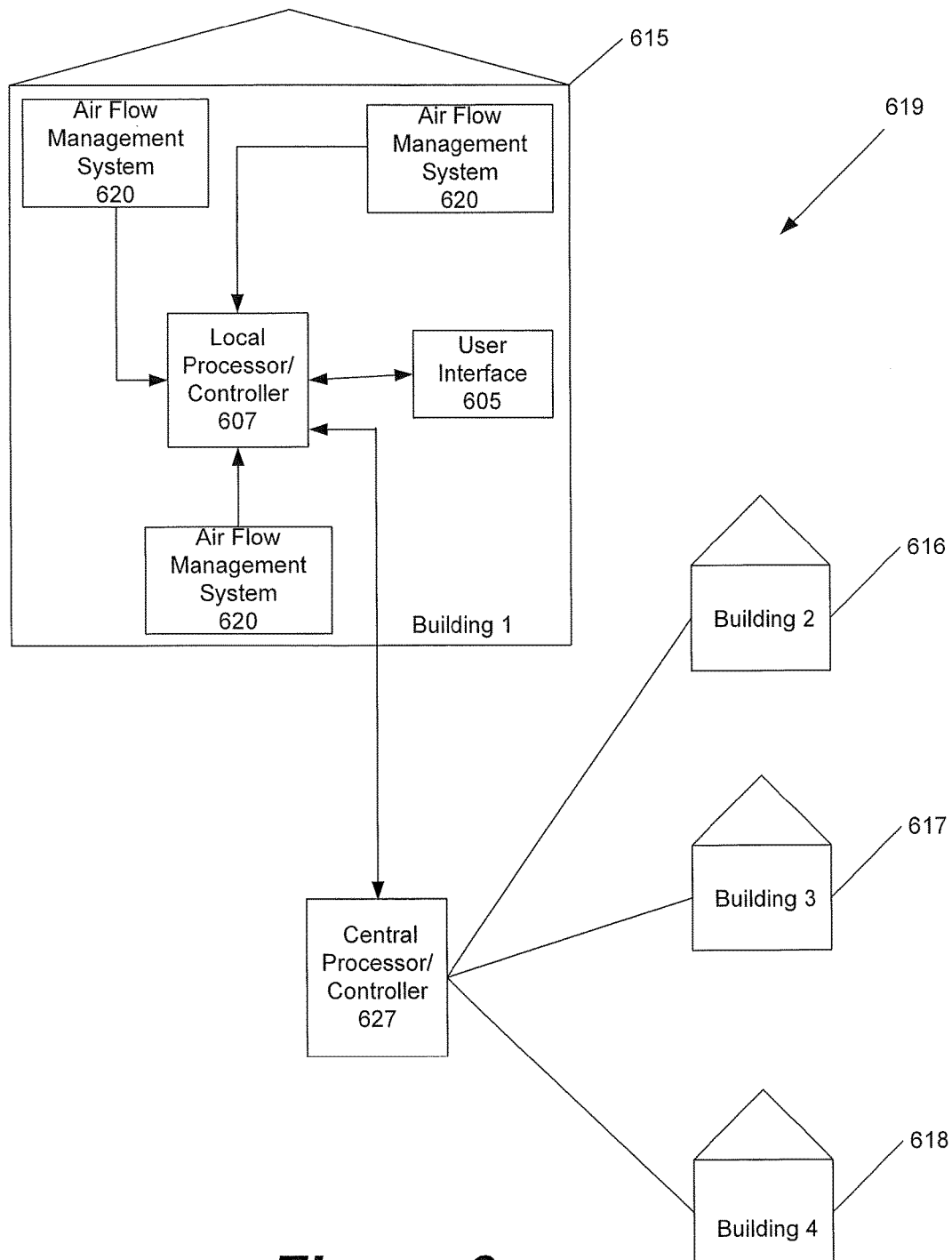
FIG. 6 is a block diagram of system including multiple buildings in accordance with some embodiments of the present inventive concept.

Referring now to FIG. 6, an HVAC system including local and central data processing systems according to some embodiments of the present inventive concept will be discussed. As illustrated in FIG. 2, an HVAC system 619 according to some embodiments of the present inventive concept may include first through fourth buildings 615, 616, 617 and 618, a central processor/controller 627, and a remote location 628. As further illustrated in FIG. 6, the first through fourth buildings 615, 616, 617 and 618 are coupled to the central processor/controller 627. The central processor/controller 627 may communicate with the first through fourth buildings 615, 616, 617 and 618 using, for example, a protocol that has been optimized, or adapted specifically for the purpose of this type of communication by incorporating, for example, explicit or implicit references, pointers or locators for processed reference data, performance metrics, time stamps, authentication codes, or anonymization process related variables.

As further illustrated in FIG. 6, the first building 615 (as well as the second through fourth buildings, although not illustrated in FIG. 6) includes one or more local processor/controllers 607, a user interface 605 and one or more air flow measurement systems 620 installed in the HVAC ducts in accordance with some embodiments of the present inventive concept. The user interface 605 and the air flow measurement systems 620 are coupled to the one or more local processor/controllers 607. It will be understood that although only a single user interface 6-5 and three systems 620 are illustrated in FIG. 6, embodiments of the present inventive concept are not limited to this configuration. For example, two or more user interfaces 607 and many systems 620 may be provided without departing from the scope of the present inventive concept.

The local processor/controller 607 may include the modules and operate as discussed above with respect to FIG. 5A. Similarly, the central processor/controller 627 may include the modules and operate as discussed above with respect to FIG. 5B.

Figure 7:
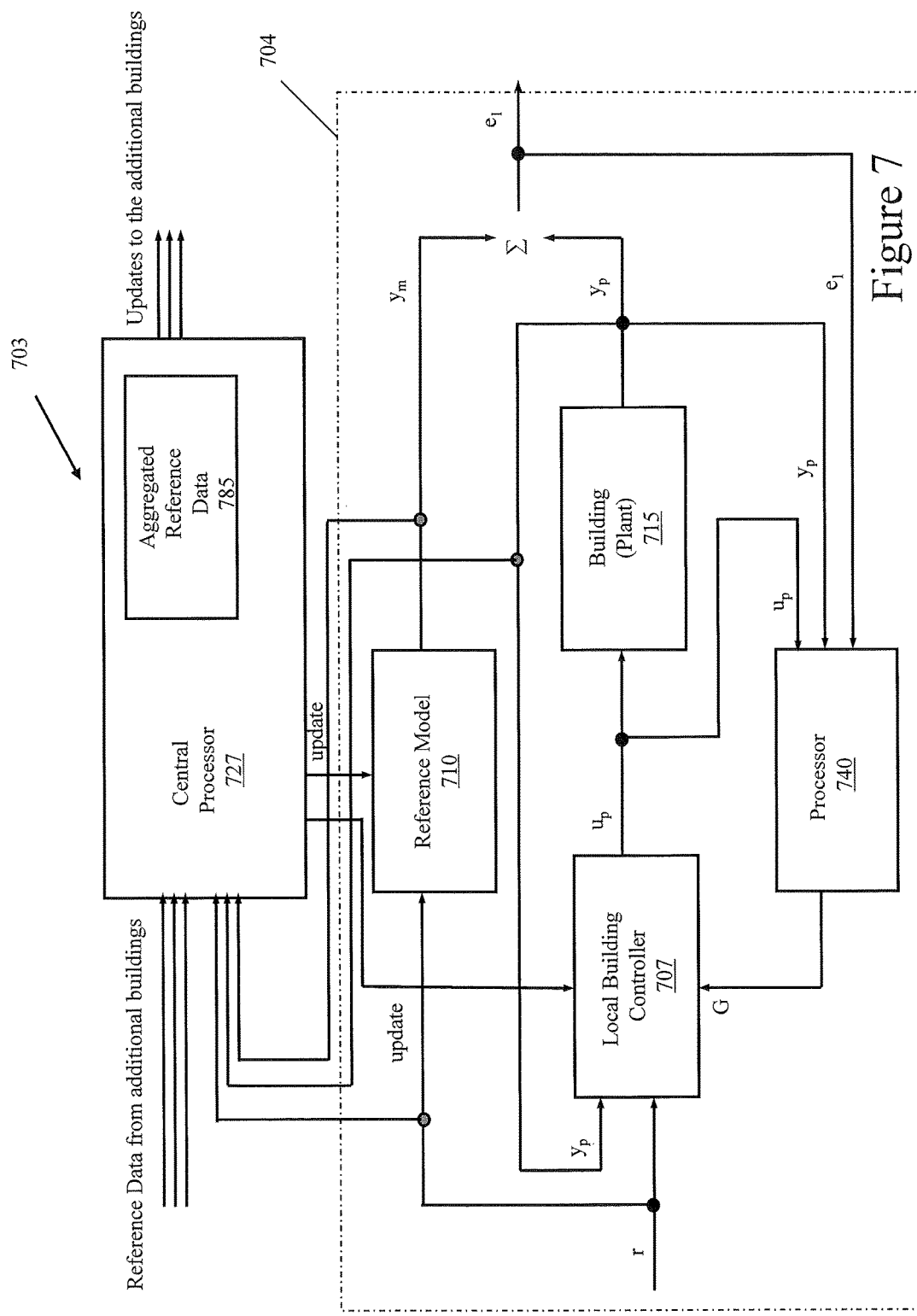
FIG. 7 is a block diagram illustrating a reference model in accordance with some embodiments of the present inventive concept.

Referring now to FIG. 3, a block diagram illustrating an exemplary climate control system according to some embodiments of the present inventive concept will be discussed. As illustrated in FIG. 7, the HVAC system 703 includes a local data processor 704 and a central processor 727. Furthermore, the local data processor includes a reference model 710, a local building controller 707, a building (plant) 715 and a processor 740. As further illustrated, the central processor 727 includes the aggregated reference data 785, which may include data collected by the thermistors, humidity sensors, pressure sensors and the like in accordance with various embodiments discussed herein.

First, the local data processing system 704 and the elements thereof will be discussed. In particular, the local building controller 707 receives r and $y_p$, where r is the input command vector, which represents the planned intended state (performance metrics and/or specifications of the plant), and where $y_p$ is the actual plant output vector, represented by the actual sensed data, i.e., actual state of the building. These two inputs vectors are compared and if they are not the same, one or more parameters of the controller 707 are adjusted and the control output vector $u_p$ is modified accordingly. Thus, the controller 707 generates input parameters for the plant 715, such as, close the damper, turn on the heat, turn on the AC and the like. Since, the building (plant) 715 is not linear or time invariant, it experiences state changes due to windows opening, weather changes, humidity changes and the like. The output vector of the building (plant) 715 represents the actual plant state $y_p$, which is compared to the output of the reference model 710. If the sum $e_1$ (a tracking error vector) of $y_p$ and $y_m$ not zero, then the processor 740 adjusts a gain vector G until the sum of $y_p$ and $y_m$ is zero. Thus, the local data processing system 704 is capable of adjusting various parameters to regulate the air flow in the ducts of the HVAC system. Details with respect to the model reference adaptive control approach as discussed with respect to FIG. 7 are discussed in *Robust Adaptive Control* to P. A. Ioannou et al. (Prentice Hall, 1996, p. 314), the disclosure of which is hereby incorporated herein by reference as if set forth in its entirety.

As further illustrated in FIG. 7, the reference model 710 and the building controller 707 are updated by the central processor 727. The reference model according to some embodiments of the present inventive concept is unique due to the derivation and the ongoing modification of the reference model 710 based on data collected from different buildings. For example, when embodiments of the present inventive concept are used in conjunction with a newly constructed building, the initial parameters for a reference model that is unique for that particular building may be derived from initial specifications collected during the planning phase of the building and from aggregated reference data 785 collected previously from other buildings coupled to the central sever. Once the initial reference model 710 is constructed, it will be adapted and modified for the specific circumstances and operating conditions of this particular newly constructed building according to some embodiments of the present inventive concept.

Various embodiments were described herein with reference to the accompanying drawings, in which embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the inventive concept. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concept. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, if used herein, the common abbreviation "e.g.", which derives from the Latin phrase exempli gratia, may be used to introduce or specify a general example or examples of a previously mentioned item, and is not intended to be limiting of such item. If used herein, the common abbreviation "i.e.", which derives from the Latin phrase id est, may be used to specify a particular item from a more general recitation.

Exemplary embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit such as a digital processor, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present inventive concept may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the inventive concept and, although specific terms are employed, they are used in a generic and descriptive sense only and not for purposes of limitation, the scope of the inventive concept being set forth in the following claims.

That which is claimed is:

1. A heating, ventilating and air conditioning (HVAC) system, the system comprising:
   at least one duct;
   a high resolution airflow measurement system positioned in the duct, the high resolution airflow measurement system including thermistor pairs in a first plurality of cells in the duct, each pair including a self-heated thermistor and a reference thermistor and the high resolution system being configured to be removed from the duct and replaced by a low resolution airflow measurement system, the low resolution airflow measurement system including thermistor pairs in a second plurality of cells in the duct, the second plurality being less than the first plurality;

a power module configured to regulate a variable amount of power delivered to the self-heated thermistor;

an analog to digital convertor (ADC) configured to receive a non-linear output of the self-heated thermistor; and a calculation module configured to receive an output of the ADC and calculate data used to control air flow in the HVAC system.

2. The system of claim 1, further comprising a measurement module configured to continuously measure an amount of power being delivered to the self-heated thermistor, wherein the power module is further configured to adjust the amount of power delivered to the self-heated thermistor responsive to the measured power.

3. The system of claim 2, wherein the measurement module is configured to continually measure the amount of power delivered to the self-heated thermistor, a resistance of the self-heated thermistor and a resistance of the reference thermistor.

4. The system of claim 3, wherein the calculation module is further configured to:

determine temperatures of the self-heated thermistor and the reference thermistor using a temperature-resistance relationship of thermistors;

compare the temperature of the self-heated thermistor to a temperature of a reference thermistor to obtain a comparison result; and determine an ambient temperature based on the comparison result.

5. The system of claim 4, wherein the calculation module is configured to calculate a temperature rise based on a difference between the temperature of the self-heated thermistor and the temperature of the reference thermistor.

6. The system of claim 5, wherein the calculation module is further configured to calculate an airflow rate based on the temperature rise, an amount of electrical power delivered to the self-heated thermistor and coefficients determined during system calibration.

7. The system of claim 1, further comprising a filter positioned upstream of the high resolution air flow measurement system.

8. A computer program product for measuring air flow in a heating, ventilation and air conditioning (HVAC) system, the computer program product comprising:

a non-transitory computer readable storage medium including computer readable program code embodied therein, the computer readable program code comprising:

computer readable program code configured to receive data collected in an HVAC system using a high resolution system including thermistor pairs in a first plurality of cells in a duct of the HVAC system, each pair including a self-heated thermistor and a reference thermistor and the high resolution system being configured to be removed from the duct and replaced by a low resolution airflow measurement system, the low resolution airflow measurement system including thermistor pairs in a second plurality of cells in the duct, the second plurality being less than the first plurality; and computer readable program code configured to calculate configuration details for the HVAC system based on the received collected data associated with the HVAC system and data associated with other HVAC systems provided by a centralized reference model.

9. The computer program product of claim 8, further comprising:

computer readable program code configured to regulate a variable amount of power delivered to the thermistor pairs and provide a non-linear output of the thermistor pairs to an analog to digital convertor (ADC); and computer readable program code configured to receive an output of the ADC and calculate data used to control air flow in the HVAC system.

10. The computer program product of claim 9, further comprising:

computer readable program code configured to continuously measure an amount of power being delivered to the thermistor pairs; and computer readable program code configured to adjust the amount of power delivered to the thermistor pairs responsive to the measured power.

11. The computer program product of claim 10, further comprising computer readable program code configured to continually measure the amount of power delivered to the thermistor pairs, a resistance of the thermistor pairs and a resistance of the reference thermistor.

12. The computer program product of claim 11, further comprising:

computer readable program code configured to determine temperatures of the thermistor pairs and the reference thermistor using a temperature-resistance relationship of thermistors;

computer readable program code configured to compare the temperature of the thermistor pairs to a temperature of a reference thermistor to obtain a comparison result; and computer readable program code configured to determine an ambient temperature based on the comparison result.

13. The computer program product of claim 12, further comprising computer readable program code configured to calculate a temperature rise based on a difference between the temperature of the thermistor pairs and the temperature of the reference thermistor.

14. The computer program product of claim 8, wherein the high-resolution system including self-heated thermistors in all of the plurality of cells in the HVAC system is replaced by a lower resolution system including self-heated thermistors in less than all of the plurality of cells, wherein the plurality of cells comprise a plurality of tubes coupled together in the high and low resolution systems.

* * * * *